United States Patent
Verga

[15] 3,640,124
[45] Feb. 8, 1972

[54] RESONANT FIXTURE VIBRATION AMPLIFIER

[72] Inventor: John Verga, Rockville Centre, N.Y.
[73] Assignee: Hazeltine Research, Inc.
[22] Filed: June 18, 1969
[21] Appl. No.: 834,399

[52] U.S. Cl. ................................................73/71.6, 73/67.2
[51] Int. Cl. ................................................G01n 29/00
[58] Field of Search ................................73/71.6, 67.2

[56] References Cited

UNITED STATES PATENTS 3,477,281  11/1969  Helmuth..................................73/71.6
3,027,747  4/1962  York et al..............................73/71.6 X

OTHER PUBLICATIONS

M. B. Vibration Notebook, Vol. 1, No. 1, March, 1955 pp. 3

*Primary Examiner*—Richard C. Queisser
*Assistant Examiner*—Arthur E. Korkosz
*Attorney*—Kenneth P. Robinson

[57] ABSTRACT

Disclosed is a resonant fixture vibration amplifier capable of producing accelerations along a single axis without fatiguing. The amplifier utilizes a resonant member equally fixed at opposite ends, centrally loaded, and capable of resonating at a selected frequency, thereby subjecting test specimens to accelerations along a single axis.

5 Claims, 3 Drawing Figures

PATENTED FEB 8 1972  3,640,124

RESONANT FIXTURE VIBRATION AMPLIFIER

BACKGROUND OF THE INVENTION

This invention relates to mechanical vibrators and more specifically to vibration amplifiers utilizing a resonant fixture to obtain increased acceleration levels from a limited vibration source.

When it is necessary to subject test specimens to accelerations of a higher level than an existing vibrator is capable of producing, a new vibrator of increased capacity can be purchased, or it has been proposed that a vibration amplifier, capable of increasing the acceleration level, be attached to the existing vibrator.

Proposed vibration amplifiers for use in combination with an existing vibrator have been inadequate in one or both of the following areas. Undesirable rotational accelerations can be introduced into the testing process by a vibration amplifier, possibly causing destruction of test specimens which have been designed to withstand linear, but not rotational, accelerations. In addition, vibration amplifiers normally are subjected to high internal stress forces during operation which can cause the amplifier to fatigue, rendering it incapable of repetitive operation.

It is not always possible to obtain a new vibrator with the required capacity, as commercial vibrators are generally limited in output acceleration by the weight of the armature and vibration head. Furthermore, it would be expensive and inconvenient to obtain a new vibrator for every specialized acceleration requirement.

It is therefore an object of this invention to provide a new form of mechanical vibration amplifier capable of producing accelerations along a single axis without fatiguing.

It is a further object of this invention to provide an inexpensive and easily adjustable vibration amplifier, capable of being adjusted to satisfy many different acceleration requirements.

In accordance with the invention a mechanical vibration amplifier capable of producing accelerations along a single axis, includes a resonant member of a length, width, thickness and material suitable for resonating at a selected frequency and acceleration level without fatiguing. Also included are means for equally fixing opposite ends of the resonant member to a vibration source and for transmitting mechanical vibrations from the source to the resonant member. Finally included are means for attaching test specimens at a position midway between the fixed opposite ends of the resonant member, thereby centrally loading the member and permitting test specimens to be subjected to amplified vibrations with accelerations along a single axis.

For a better understanding of the present invention, together with other and further objects thereof, reference is had to the following description, taken in connection with the accompanying drawing, while its scope will be pointed out in the appended claims.

Referring to the drawing.

DESCRIPTION OF THE INVENTION

Figure 1:
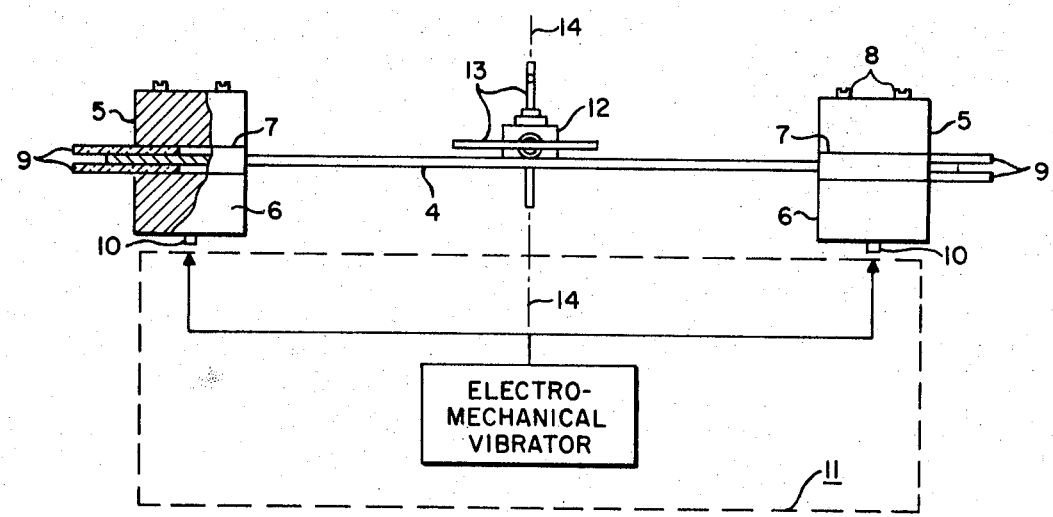
FIG. 1 is an illustration of an embodiment of the invention.
Figure 2:
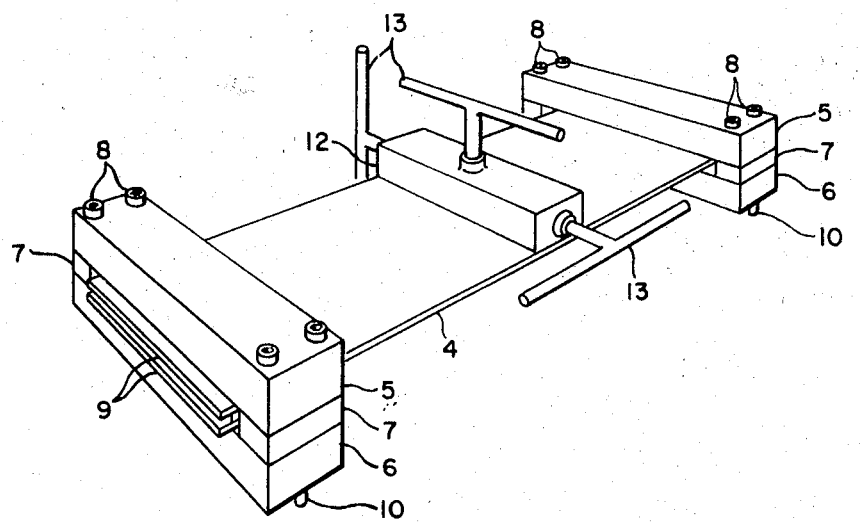
FIG. 2 is a perspective view of the embodiment of the invention shown in FIG. 1.
Figure 3:
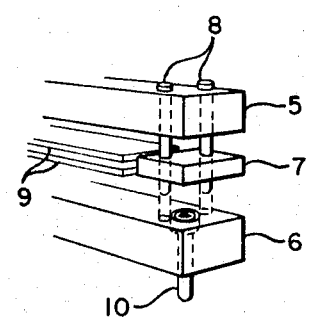
FIG. 3 is an exploded view of a portion of the embodiment illustrated in FIG. 1.

FIGS. 1, 2 and 3 illustrate, in different views, a vibration amplifier which embodies the present invention and includes a flat rectangular-shaped member 4, designed, with respect to its dimensions and material, to resonate at a selected frequency and acceleration level without fatiguing. Attached to opposite ends of the resonant member are a pair of clamping assemblies, each of which consists of a clamping block 5 and a base block 6, separated at both ends by spacer inserts 7, and held together by screws 8 as shown in greater detail in the exploded perspective view of FIG. 3. In the present embodiment, the pair of clamping assemblies constitute means for equally fixing opposite ends of the member 4 to a suitable vibration source 11, such as a conventional vibrator driven shake table and for equally transmitting mechanical vibrations from the source 11 to the member 4. Each base block 6 is equipped with one or more adapting screws 10 to fasten the clamping assemblies to the vibration source.

Finally included in the vibration amplifier is an adapter block 12 mounted at a position midway between the fixed opposite ends of resonant member 4. The adapter block serves to accept test specimens, such as the dipole antenna elements 13, and to centrally load the member 4, thereby permitting the test specimens to be subjected to amplified accelerations along a single axis when mechanical vibrations are applied to the amplifier from vibration source 11.

In those cases where it is desired to test specimens at different vibration conditions, vibration amplifiers constructed according to the present invention offer particular versatility, since by merely adjusting both the resonant frequency of member 4 and the frequency of vibration source 11, different vibration conditions can be produced at the adapter block 12. Included in the embodiment of FIG. 1 as means for adjusting the resonant frequency of the member 4 are two pairs of rectangularly shaped damping inserts 9, located between the clamping blocks 5 and the member 4 and the base blocks 6 and the member 4. The inserts 9 are positioned such that when the clamping assemblies are fastened together the interior ends of the inserts will determine the points at which opposite ends of the member 4 are effectively fixed. Moving the inserts along an axis parallel to the length of the member 4, will produce a change in its effective vibrating length by changing the points at which the opposite ends are fixed. Those skilled in the art will recognize that changing the effective vibrating length of member 4 changes its resonant frequency; longer lengths having a lower resonant frequency and shorter lengths having a higher resonant frequency. By adjusting the resonant frequency of the member 4 to correspond to each one of a series of different frequencies of the vibration source 11, a series of different vibration conditions can be produced at the adapter block 12 by the same vibration amplifier.

OPERATION OF THE INVENTION

Referring to FIG. 1, mechanical vibrations of equal phase and magnitude are applied from source 11 to both base blocks 6 of the clamping assemblies. These vibrations are equally transmitted through the clamping assemblies and the movable inserts 9 to the ends of the resonant member 4. The member, having specifically been selected as to length, width, thickness and material to have a resonant frequency equal to the frequency of the vibration source, will be forced to resonate at that frequency. As will be recognized by those skilled in the art, the center of the member, centrally loaded by the test specimen adapter 12, will experience amplitude deflections at the resonant frequency along a single vertical axis, shown as 14 in FIG. 1. Since the center of member 4 experiences maximum deflection at the resonant frequency it will also experience maximum acceleration, thereby subjecting test specimens attached to the adapter 12 to amplified accelerations along the single axis 14. Acceleration of the center of member 4 in resonance will also determine the maximum stress applied to the member. The length, width, thickness, and load for a particular material can be chosen so that the resonant stress is equal to or less than the fatigue endurance limit of the member, thereby enabling repetitive use of the member without fatiguing.

More specifically, a resonant member in accordance with the invention can be constructed to resonate at a selected frequency and acceleration level without fatiguing by designing the member to satisfy the following equations:

$$f_r = C_n \sqrt{\frac{E}{\left(\frac{W_e}{b}\right)\left(\frac{L}{T}\right)^3}} \qquad (1)$$

$$S_r = C_r \left(\frac{W_e}{b}\right)\left(\frac{L}{T^2}\right) G \qquad (2)$$

where:
$f_r$ = the selected resonant frequency;
$E$ = the flexure modulus of the material used for the member 4;
$W_e$ = the weight concentrated at the center of the member, and generally consists of the combined weight of the adapter 12 and test specimens 13, as the component of the weight of the member 4 concentrated at the center is usually negligible;
$b$ = the width of the member 4;
$L$ = the length between fixed opposite ends of member 4;
$T$ = the thickness of the member;
$S_r$ = the maximum stress on the member 4, at resonance, and must be less than the fatigue endurance limit of the material;
$G$ = the required acceleration level to which test specimens are to be subjected, and
$C_n$ & $C_r$ = constants dependent upon the fixity of the end supports for member 4.

The support fixity is determined by the method utilized in fixing the ends of the member 4 and may take on any value between a simple support (no clamp) and a theoretical fixed end (rigid clamp). In the embodiment of FIG. 1, the ends of member 4 are effectively fixed by the movable inserts 9, which may be constructed from different materials exhibiting different amounts of support fixity. While the support fixity of particular inserts can be determined by simple experimental tests, in general rigid materials will have a high degree of fixity while pliable materials will have a relatively small amount of fixity. Once the support fixity is determined $C_n$ and $C_r$ can be calculated by interpolation between the theoretical values of $C_n$ and $C_r$ for a rigidly fixed end and a simply supported member. It has been found that inserts 9, constructed from viscoelastic Fiberglass compounds exhibit a support fixity of 50 percent. That is the natural frequency of a member fixed by these inserts occurs halfway between the natural frequency for the rigidly clamped and no clamp conditions. Values of $C_n$ and $C_r$ are as follows:
$C_n$ clamp = 12.5
$C_r$ clamp = 0.75
$C_n$ no clamp = 6.25
$C_r$ no clamp = 1.51
$C_n$ and $C_r$ for the viscoelastic Fiberglas inserts are then found as halfway between the limiting values or:
$C_n$=9.38
$C_r$=1

Equation (1) above defines the resonant frequency of a beam for vibration in the fundamental mode. Member 4 shaped as a rectangular plate which is centrally loaded and equally fixed at opposite ends satisfies this equation. The length, width, thickness and material of the resonant member 4 can be chosen according to equation (1) to resonate at any selected frequency and undergo a resonant stress, defined by equation (2), less than the fatigue endurance limit of the member. If a member is to be designed for operation at different vibration conditions, equation (1) should be satisfied for every frequency at which the member will be resonated, and equation (2) should yield a resonant stress ($S_r$) which is less than the fatigue endurance limit applicable to each of the different vibration conditions.

There are several methods of applying equations (1) and (2) in order to obtain a properly designed resonant member. For example, a set of tables embodying combinations of all variables presented in the equations may be utilized to select the design parameters of a member to satisfy a desired set of test conditions.

Graphical analysis also can be employed with facility and success in constructing resonant fixture amplifiers in accordance with the teachings of the invention. This involves plotting a series of graphs relating the desired values of $f_r$ and $S_r$ to the dependent variables $L$, $T$ and $W$ for different materials and different weight concentrations. Various practical considerations can be reflected on the graphs such as maximum and minimum member lengths, preferred materials, required vibration conditions and fatigue endurance limits for each material. Dimensions and material for an optimum resonating member can then be selected from the family of plotted curves. Graphs of the following relations have proven useful in this type of analysis.

$f_r/\sqrt{E}$ vs. $L/T$ (3) Plotted for a series of $W_e/b$,
$S_r/g$ vs. $T$ (4) Plotted for a series of $W_e/b$ and a constant length,
$S_r/g$ vs. $T$ (5) Plotted for a series of $L$ and a constant $W_e/b$,
$S_r/g$ vs. $T$ (6) Plotted for a series of $L/T$ and a constant $W_e/b$,
where $f_r/\sqrt{E}$ is the resonant frequency normalized for the flexure modulus, $W_e/b$ is the effective weight per unit width, $L/T$ is the length to thickness ratio, and $S_r/g$ is the resonant stress per unit acceleration.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A mechanical vibration amplifier capable of producing accelerations along a single axis, comprising:
a resonant member of length, width, thickness and material suitable for resonating at a selected frequency and acceleration level without fatiguing and constructed to satisfy the equations:

$$f_r = C_n \sqrt{\frac{E}{\left(\frac{W_e}{b}\right)\left(\frac{L}{T}\right)^3}}$$

where $f_r$ is the selected resonant frequency of the resonant member, $E$ is the flexure modulus of the member material, $W_e$ is the weight concentrated at the center of the resonant member, $b$ is the width of the resonant member, $L$ is the length between the fixed ends of the resonant member, $T$ is the thickness of the resonant member, and $C_n$ is a constant determined by the fixity of the ends of the resonant member; and $$S_r = C_r \left(\frac{W_e}{b}\right)\left(\frac{L}{T^2}\right) G$$

where $S_r$ is the stress on the member at resonance and is less than the fatigue endurance limit of the resonant member material, $G$ is a desired acceleration testing level and $C_r$ is a constant determined by the fixity of the ends of the resonant member;
means for equally fixing opposite ends of said resonant member to a vibration source and for transmitting mechanical vibrations from said source to said resonant member;
and means for attaching test specimens to said resonant member at a position midway between said fixed opposite ends, thereby centrally loading said member and permitting test specimens to be subjected to amplified vibrations with accelerations along a single axis.

2. A mechanical vibration amplifier in accordance with claim 1, wherein said resonant member is a relatively thin, flat, rectangular plate of a length substantially greater than its width.

3. A mechanical vibration amplifier capable of producing adjustable accelerations along a single axis, comprising:
a resonant member of length, width, thickness and material suitable for resonating at selected frequencies and at selected acceleration levels without fatiguing and constructed to satisfy the equations:

$$f_r = C_n \sqrt{\frac{E}{\left(\frac{W_e}{b}\right)\left(\frac{L}{T}\right)^3}}$$

where $f_r$ is the selected resonant frequency of the resonant member, $E$ is the flexure modulus of the member material, $W_e$ is the weight concentrated at the center of the resonant member, $b$ is the width of the resonant member, $L$ is the length between the fixed ends of the resonant member, $T$ is the thickness of the resonant member, and $C_n$ is a constant determined by the fixity of the ends of the resonant member; and $$S_r = C_r \left(\frac{W_e}{b}\right) \left(\frac{L}{T^2}\right) G$$

where $S_r$ is the stress on the member at resonance and is less than the fatigue endurance limit of the resonant member material, $G$ is a desired acceleration testing level and $C_r$ is a constant determined by the fixity of the ends of the resonant member;

means for adjusting the resonant frequency of said resonant member to any one of said selected frequencies;

means for equally fixing opposite ends of said resonant member to a vibration source and for transmitting mechanical vibrations from said source to said resonant member;

and means for attaching test specimens to said resonant member at a position midway between said fixed opposite ends, thereby centrally loading said member and permitting test specimens to be subjected to amplified vibrations with accelerations along a single axis.

4. A mechanical vibration amplifier capable of producing adjustable accelerations along a single axis comprising:

a resonant member of length, width, thickness and material suitable for resonating at selected frequencies and at selected acceleration levels without fatiguing;

means for equally fixing opposite ends of said resonant member to a vibration source and for transmitting mechanical vibrations from said source to said resonant member;

means, including a pair of rectangularly shaped damping inserts, of a width at least equal to the width of the resonant member and of a length substantially less than that of the resonant member, located between and in contact with said fixing means and said resonant member and movable along an axis parallel to said resonant member for adjusting the effective vibrating length and therefore the resonant frequency of the member;

and means for attaching test specimens to said resonant member at a position midway between said fixed opposite ends thereby centrally loading said member and permitting test specimens to be subjected to amplified vibrations with accelerations along a single axis.

5. A mechanical vibration amplifier in accordance with claim 4 wherein said adjusting means adjusts the effective vibrating length of said resonant member thereby adjusting its resonant frequency.

* * * * *